United States Patent [19]

Ito

[11] Patent Number: 5,067,166
[45] Date of Patent: Nov. 19, 1991

[54] METHOD AND APPARATUS FOR DP MATCHING USING MULTIPLE TEMPLATES

[75] Inventor: Nobuyasu Ito, Kawasaki, Japan

[73] Assignee: International Business Machines Corporation, Armonk, N.Y.

[21] Appl. No.: 498,310

[22] Filed: Mar. 23, 1990

[30] Foreign Application Priority Data

Mar. 24, 1989 [JP] Japan .................................. 1-70442

[51] Int. Cl.$^5$ ............................................. G06K 9/68
[52] U.S. Cl. ...................................... 382/37; 382/30; 382/38
[58] Field of Search ............... 381/41, 42, 43; 382/30, 382/34, 37, 38; 364/513.5

[56] References Cited

U.S. PATENT DOCUMENTS

| | | | |
|---|---|---|---|
| 3,979,722 | 9/1976 | Sakoe | 382/30 |
| 4,467,437 | 8/1984 | Tsuruta et al. | 382/30 |
| 4,882,756 | 11/1989 | Watari | 381/42 |

OTHER PUBLICATIONS

Ney, H., et al. "A Data Driven Organization of the Dynamic Programming Beam Search for Continuous Speech Recognition", Proc. ICASSP 87, pp. 833-836, 1987.
Sakoe, H., "A Generalization of Dynamic Programming Based Pattern Matching Algorithm Stack DP--Matching", Transactions of the Committee on Speech Research, The Acoustic Society of Japan, p. S83-23, 1983.
Sakoe, H., "A Generalized Two-Level DP-Matching Algorithm for Continuous Speech Recognition", Transactions of the IECE of Japan, vol. E65, No. 11, pp. 649-656, Nov. 1982.

Primary Examiner—David K. Moore
Assistant Examiner—Jose L. Couso
Attorney, Agent, or Firm—Marc D. Schechter

[57] ABSTRACT

A pattern recognition method and apparatus using dynamic programming in which an input sequence of labels is matched to a set of candidate templates (candidate reference label sequences). The set of candidate reference label sequences is grouped into subsets, where each reference label sequence in a subset has a common root reference label subsequence. Using this set organization, a depth-first search is performed to identify a local optimum template and its local optimum match score with the input sequence of labels. Using the local optimum match score as a threshold, the input sequence of labels is matched to root reference label subsequences, eliminating those root reference label subsequences having match scores above the threshold. Surviving root reference label subsequences having match scores below the threshold remain recognition candidates, and are further investigated.

14 Claims, 10 Drawing Sheets

TREE STRUCTURE USED IN THIS METHOD

AREA WHERE RECURRENCE FORMULA CALCULATION IS PERFORMED

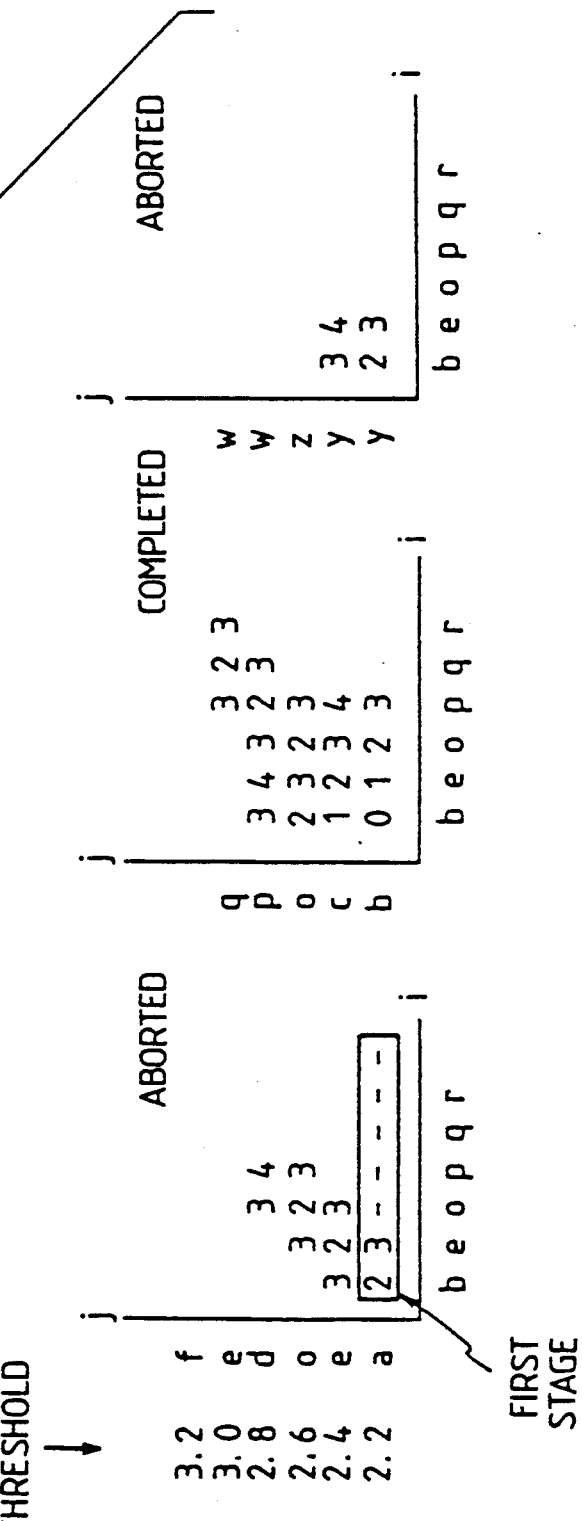

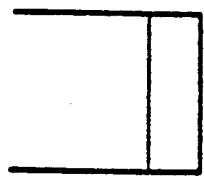
FIG. 5b STACK
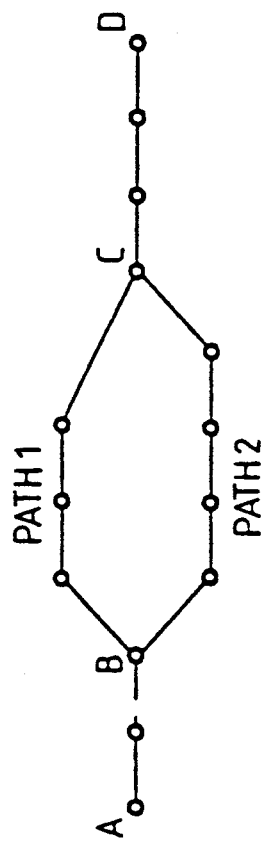
FIG. 5a TEMPLATES REPRESENTED BY GRAPH
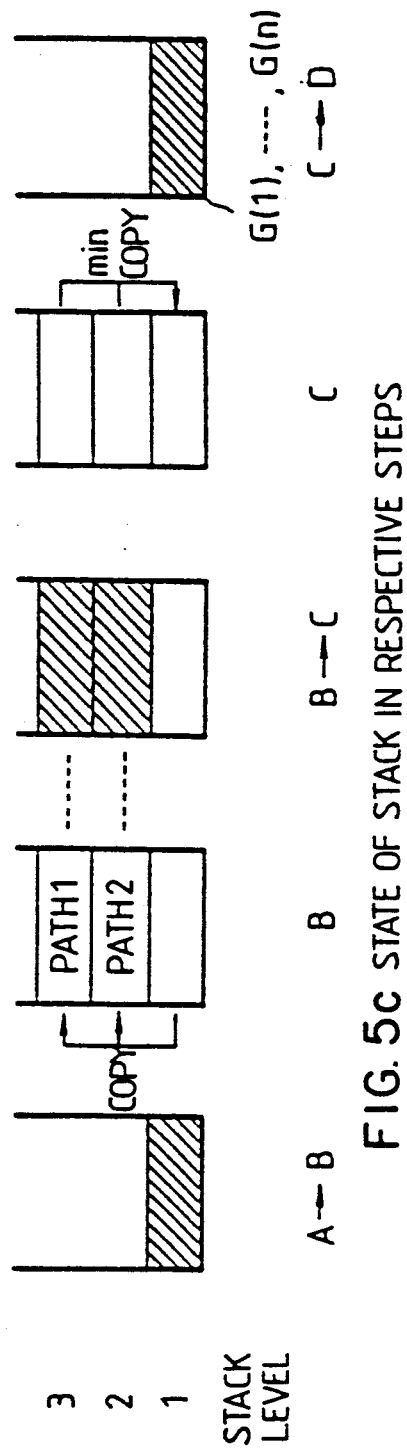
FIG. 5c STATE OF STACK IN RESPECTIVE STEPS

FORMATION OF TREE-STRUCTURED DICTIONARY
(ADDITION OF LABEL SEQUENCE)

DP MATCHING CALCULATION
(ENTIRETY)

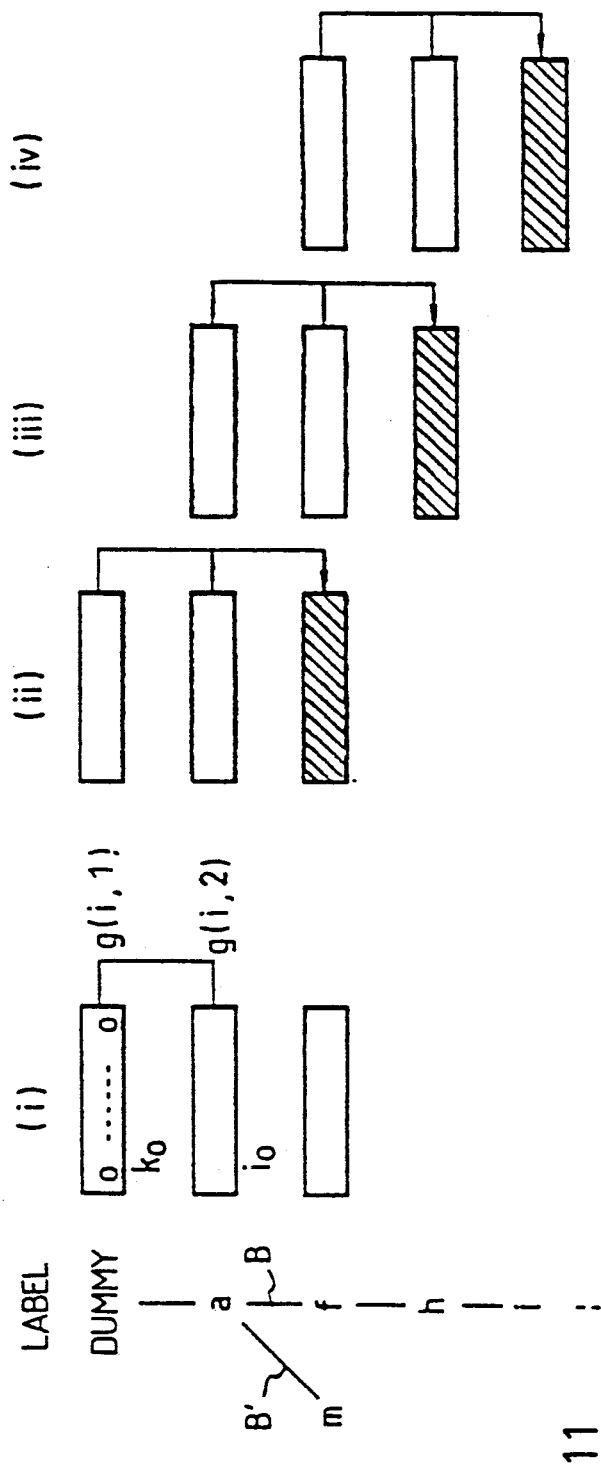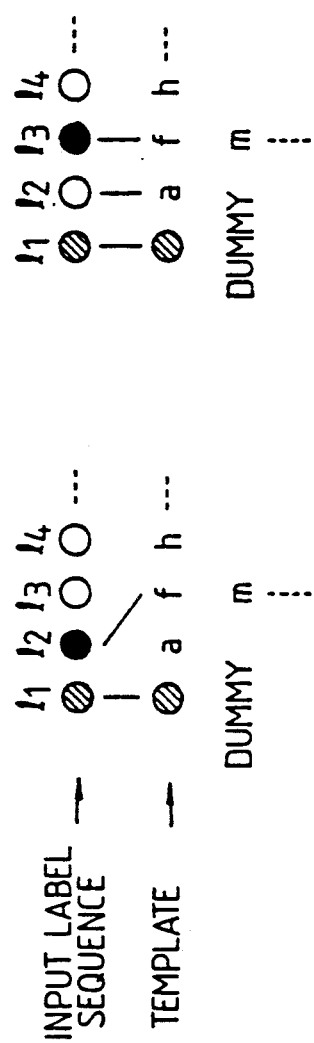
FIG. 11
FIG. 12 a
IN CASE OF SKIPPING A
FIG. 12 b
IN CASE A IS NOT SKIPPED (ASSUMING THAT $i_0 = 2$)

METHOD AND APPARATUS FOR DP MATCHING USING MULTIPLE TEMPLATES

BACKGROUND OF THE INVENTION

The present invention relates to a method and an apparatus for label-sequence DP (dynamic programming) matching usable in the fields of character recognition, speech recognition, spelling checking, data base queries for synonyms or the like, and more particularly to a method and an apparatus for DP matching in case there are multiple label-sequences to be compared.

In the fields of speech recognition or character recognition, one recognition method in general use consists of extracting features from inputted information, representing the features as an ordered label sequence, comparing the extracted label sequence with reference label sequences previously stored in a recognition dictionary (referred to as templates hereafter), and outputting the most similar (minimum distance) template as the recognition result. In cases of spelling checking, data base queries for synonyms, or the like, a character is regarded as one label and the label sequence (namely a single word) having a minimum distance to an inputted sequence is selected from a word dictionary or a data base, so that the approximate matching of the label sequence is required in the same manner as set forth above.

In this case, since the correspondence between the respective labels is not generally known (except that a relative position of each label is not reversible), it is required to define a distance by the solution having the minimum value from all possible mappings. One of the methods for calculating this distance at high speed is dynamic programming (DP). DP has many modified forms and is most typically formulated as follows.

Two label sequences to be compared are assumed to be $A = a_1, a_2, \ldots a_n$, $B = b_1, b_2, \ldots b_m$. If the label mapping or joining function is expressed by $c_p(k)$ ($k = 1, \ldots, K$), where $c_p(k)$ is the mapping or joining function for a pair of labels ($a_{ik}, b_{jk}$), the distance D between A and B can be defined as $$D(A, B) = \min_{c_p} \left[ \left( \sum_{k=1}^{K} d(c_p(k)) \right) \cdot \frac{w(k)}{\sum_{k=1}^{K} w(k)} \right] \quad (1)$$

In equation (1), $d(c_p(k))$ indicates the distance between $a_{ik}$ and $b_{jk}$. $w(k)$ indicates the distance along the path of the mapping function.

There are various types of $w(k)$. For instance, when DP is applied by regarding $w(k)$ as $w(k) = (i_k - i_{k-1}) + (j_k - j_{k-1})$, $D(A, B)$ can be calculated as $g(n, m)/(n+m)$ by the following recurrence formula $g(i, j)$.

$$g(i, j) = \min \begin{bmatrix} g(i-1, j) + d(a_i, b_j) \\ g(i-1, j-1) + 2d(a_i, b_j) \\ g(i, j-1) + d(a_i, b_j) \end{bmatrix} \quad (2)$$

In order to obtain $g(n, m)$, $g(i, j)$ is calculated for all lattice points ($m \times n$ points) satisfying ($1 \leq i \leq n$, $1 \leq j \leq m$) on the plane of (i, j), as shown in FIG. 3. Generally, the calculation of the formula (2) is executed with either of i or j fixed and the other incremented. When the calculation is completed, the fixed one is increased by 1 and a similar calculation is repeated. A respective calculation executed with only one variable increased is called one stage calculation, and the calculation itself will be called a stage calculation hereafter. In this case, either variable may be fixed, however, in the explanation hereafter, the i axis will be regarded as the input label sequence, and the j axis will be regarded the reference label sequence to be compared in a dictionary. Thus, the stage calculation will be executed with j fixed (FIG. 3).

In this DP method, the distance can be obtained by performing at most ($m \times n$) steps. Therefore, the amount of calculation can be extremely reduced. Since the number of templates to be compared or the words to be retrieved in the dictionary is, however, generally remarkably large, and the distance between each of them and the input label sequence is calculated, the problem of calculation speed still remains.

In order to overcome this problem, methods roughly classifiable into two groups have been developed. These methods and their problems are described below.

(a) Beam Search

As is apparent from the foregoing description, the calculation of m stages is required in order to carry out the DP calculation between the input label sequence and one label sequence in the dictionary. Alternatively, in a beam search, the calculation for a given stage excludes those templates found to be unlikely minimum distance candidates. Consequently, the number of calculations for the recurrence formula is reduced and the calculation speed is improved because the calculation of a given stage is carried out only for remaining templates. The unlikely minimum distance candidates may be the N highest templates. Alternatively, the stage calculation may be aborted when $g(i, j)$ exceeds a threshold function of $t(j) = a \cdot j + b$ (a, b are constant coefficients) since $g(i, j)$ is the amount of accumulation for j. In either case, however, a low probability is a reason for abortion of the stage calculation, so that the minimum value of the distance obtained as a result is only an approximate solution and not necessarily optimum.

It is understood that when the threshold for aborting the stage calculation is high, the obtained solution becomes optimum. However, it is contrary to the aim of the beam search, and a significant improvement in speed cannot be expected.

With reference to FIG. 4, an example of the beam search will be explained. A threshold function is $t = (1/5)j + 2$. Distance functions between the labels are $$d(C1, C2) = 1 \quad C1 \neq C2$$
$$d(C1, C2) = 0 \quad C1 = C2$$

and the equation (2) is used as the recurrence formula. As for DP of an input beopqr and a template aeodef, since the minimum value (3) in one stage exceeds a threshold (2.8) in the fourth stage, the DP calculation is aborted at this time. The DP calculation between the input beopqr and a template yyzww is similarly aborted at the second stage.

The optimum template may possibly be one of the templates for which the DP calculation is aborted, if the optimum template is not matched well with the beginning part of the input label sequence. This is the principal disadvantage of the beam search.

This method is disclosed in the study by H. Ney et al. entitled "A Data Driven Organization of the Dynamic Programming Beam Search for Continuous Speech Recognition", (*Proc. ICASSP* 87, pages 833-836, 1987).

(b) Stack DP

When there are two templates, in case the results of the $j_p$ and $j_q$ stages are the same and the $j_{p+1}$ and the $j_{q+1}$ labels are the same, the results of the stages for these labels are the same because of the characteristic of the recurrence formula (2). This indicates that when multiple templates share a common label sequence, it is not necessary to calculate the corresponding stage for each of the multiple templates. Thus, a method has been proposed in which the label sequences shared by the templates are grouped together, the template group is expressed by an acyclic planar graph, and the recurrence formula calculation for the shared part is executed once. This is stack DP (called by this name since a stack is used for the recurrence formula calculation).

Examples of stack DP are shown in FIGS. 5a–5c. FIG. 5a shows an example representing the templates by one graph and each node corresponds to one label. The number of branches is arbitrary and in this example, only two branches are considered for simplicity. FIG. 5b shows a stack used for the calculation and has a capacity (width) capable of storing the calculation result of one stage. FIG. 5c shows the states of the stack in steps of calculation. Parts shown with slanting lines indicate stack levels in which the stage calculation is carried out.

In stack DP, the recurrence formula calculation is performed using the stack for the respective stages sequentially along the direction of the graph (A to B). When the graph reaches to a branch point, two new stacks are used. The result of an immediately preceding stack is copied (B), and then, the respective stage calculations are carried out corresponding to the label sequences of the respective branches (B to C). Then, when a connected point is reached, the calculation results of the two stacks are compared and the smaller one is written in the original stack (used for the stage calculation before the branch)(C). The recurrence formula calculation is continued (C to D) until the graph is branched again or reaches a termination, using the written stack and its value. Each time the graph is branched or connected, similar operations and calculations are performed. When the graph reaches its termination, assuming that the values of the stage stored in the stack of a first level are G(i) (i=1, ... n), G(n) indicates the distance from the optimum template (the minimum distance).

A detailed explanation of this method is disclosed in the study by H. Sakoe entitled "A Generalization of Dynamic Programming Based Pattern Matching Algorithm Stack DP-Matching" (*Transactions of the Committee on Speech Research,* The Acoustic Society of Japan, S83-23, 1983).

According to this method, it is assured that an optimum solution is always obtained. However, since this method presupposes that the DP calculation is basically performed for every part of the graph, the improvement in the speed of calculation is based on the omission of the calculation in the common subsequence. Moreover, in order to form the acyclic planar graph having the shared parts from the respective templates, an operation for obtaining the shared partial label sequences between each pair of the templates and sequentially arranging them from the longer partial sequence without contradiction is required. Therefore, a high calculation cost is incurred for a large number of templates. Further, it is difficult to add or delete a template.

SUMMARY OF THE INVENTION

The present invention (shown schematically in FIG. 1) is a method and an apparatus for DP matching of multiple label sequences which form templates and has the following features.

(a) A tree-structured dictionary 11, where labels correspond to nodes is generated from said multiple label sequences, and is stored in a storage device 12.

(b) Each label node in the tree-structured dictionary 11 is provided with a buffer area in the storage device 12.

(c) A node of the tree-structured dictionary 11 is selected in the direction of depth (13), a stage calculation is performed between the label corresponding to the selected node and an input label sequence (14), and the result is stored in the buffer provided for the selected node and these steps are repeated. The repeated steps include the following sub-steps.

(c1) The stage calculation for the selected node is performed by referring to the stage calculation result stored in a buffer for an ancestor node of the selected node (14).

(c2) An optimum node to be selected for the next stage calculation is determined from the labels of a predetermined range of descendant node(s) of the selected node by referring to the stage calculation result stored in the buffer of a predetermined range of nodes which include the selected node at least. The optimum node is selected as a node for the next stage calculation (13).

(d) The stage calculation is performed for the node which corresponds to the end of one template. Then, the distance between the template and the input label sequence is obtained based on the stage calculation result obtained for the end node. The distance is stored with the identification data of the template as candidate solution information (16).

Further, in step (c), a minimum value obtainable as a distance between a template which includes the label corresponding to the selected node and the input label sequence is predicted on the basis of the minimum value of the calculation result obtained by performing the sub-step (c1). The predicted value is compared with the distance stored as solution candidate information and whether the sub-step (c2) should be performed or not is judged from the comparison result (15).

In addition, in step (d), each time the stage calculation is performed for the node which corresponds to the end of one template, a distance D' obtained for the template including the end node is compared with a distance D stored as solution candidate information and whether the solution candidate information should be updated or not is judged from the comparison result (16).

The invention is advantageous because once the tree structured dictionary in which multiple templates correspond to the access paths is formed, the calculation of the recurrence formula need be performed only once for all templates having the same common label subsequence starting from the root node.

Moreover, the invention assures that an optimum solution obtained.

The DP calculation is performed according to the invention in a depth-first manner, by selecting the best matching branches, so that the access path with the minimum distance can be detected relatively fast. The DP calculation is carried out for other template groups using the best minimum distance value obtained as a threshold, and the calculation for the template group in question is aborted when the intermediate result of the DP exceeds the threshold. Therefore, the total number of calculations for the recurrence formula is remarkably reduced in comparison with the case where the recurrence calculation is performed for each template. The invention is especially effective in pattern recognition applications where at least one of the templates is very similar to some input (namely, the distance between the template and the input is extremely small).

Slightly more storage capacity is required in the invention because of the tree structure employed. However, operations for sorting the templates into groups, and for adding or deleting templates can be performed much more easily and more quickly, particularly as compared to the stack (acyclic graph) method.

BRIEF DESCRIPTION OF THE DRAWINGS

FIG. 4 explains a beam search.

FIGS. 5a, 5b and 5c explain stack DP.

FIG. 11 explains processes for performing stage calculations according to the tree-structured dictionary shown in FIG. 10.

FIGS. 12a and 12b show examples of the mapping of an input label sequence and a template.

DESCRIPTION OF THE PREFERRED EMBODIMENT

Similarly to the explanation of the prior art, A denotes an input label sequence and B denotes one of templates in a dictionary. The input label sequence is generally fed from a character recognition unit or a speech recognition unit. Assuming that the values of the x stage have been obtained, it is apparent that all of the values $(g(i, x+1))$ of the $(x+1)$ stage can be obtained from those values, the value of $b_{x+1}$ and the input label sequence A (refer to FIG. 3) because of the characteristic of the recurrence formula. In view of this, the respective templates are designed to be represented by a tree structure where each node corresponds to a label and each access path corresponds to one template.

Figure 1:
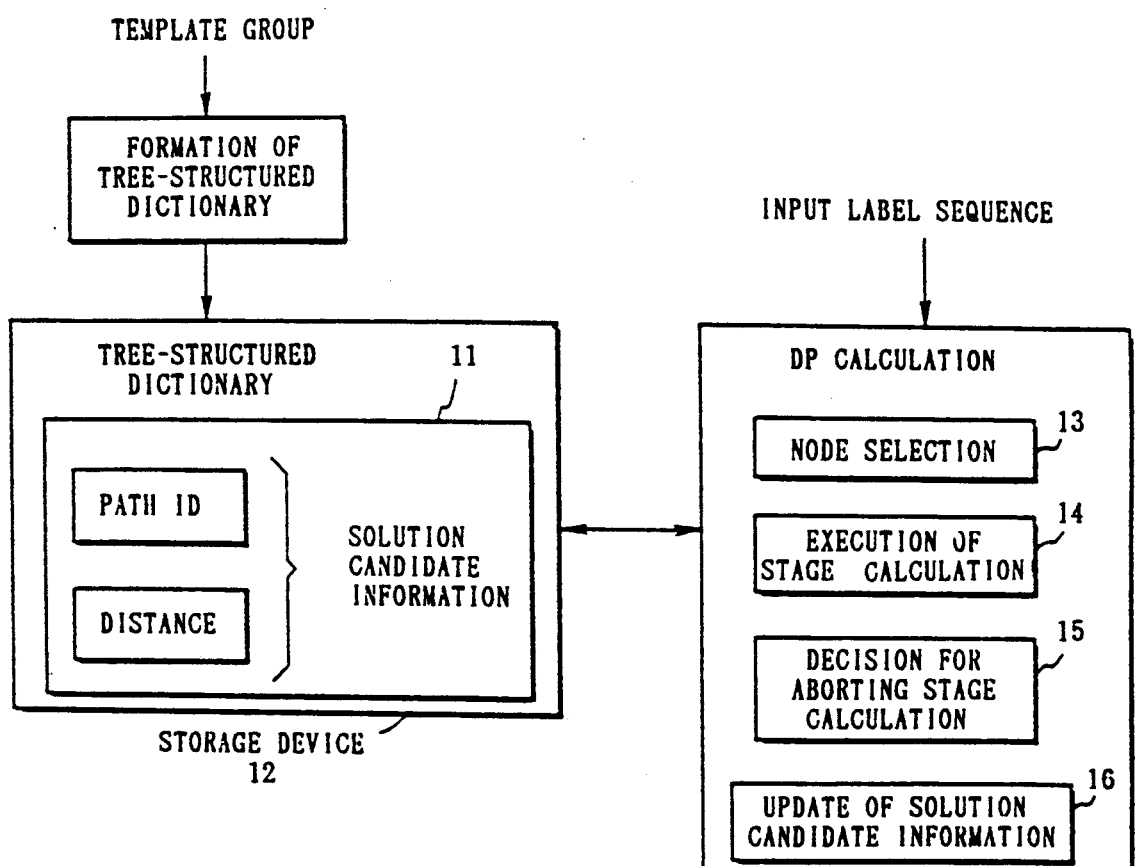
FIG. 1 shows a DP matching apparatus using the present invention.
Figure 2:
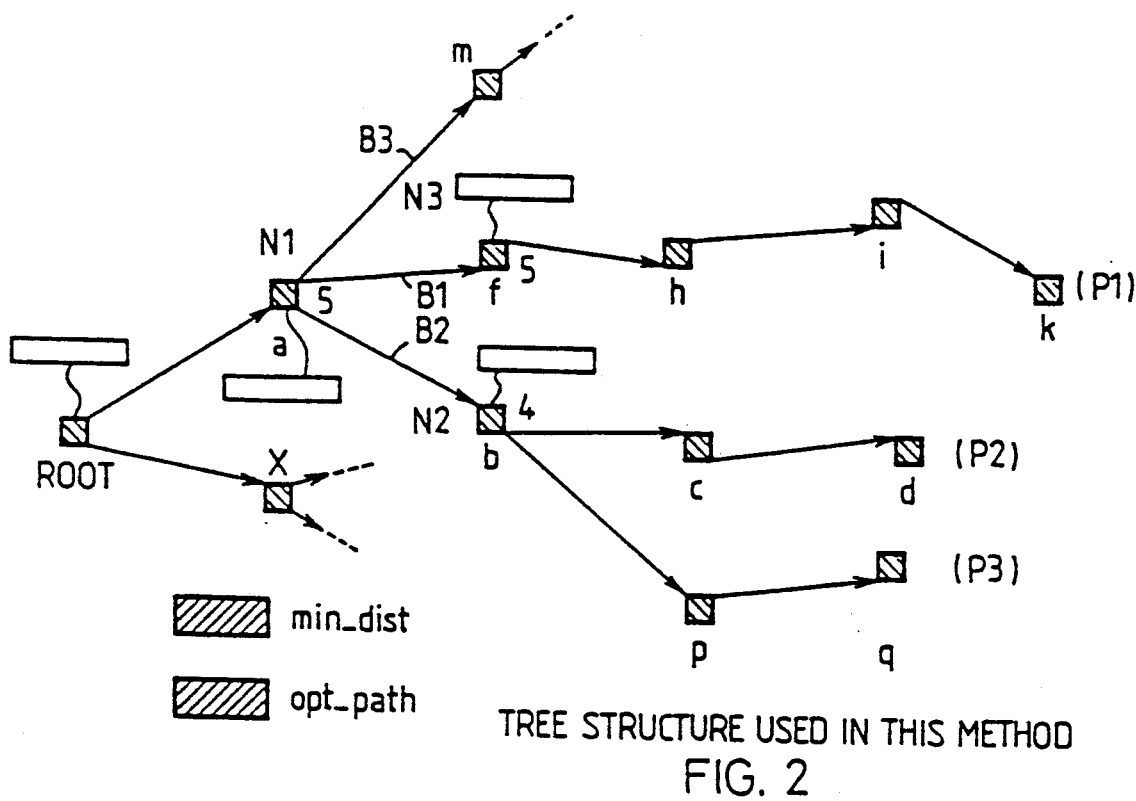
FIG. 2 explains one example of a tree-structured dictionary.

For instance, when three label sequences abcd, afhik, abpq are used, a tree as shown in FIG. 2 is obtained. In each node (N1, N2, N3, . . . ), the labels corresponding thereto, succeeding labels and pointers to their nodes, and the value of the length (the number of levels counted from root to the end) of the longest access path traceable from the current node are stored. As shown in FIG. 2, the length of the longest access paths for a and f is 5, and the length of the longest access path for b is 4. An identifier is provided for each access path (P1, P2, P3, . . . ). Each node is provided with a buffer having n arrays (namely, capable of storing the calculation result of one stage) where the result $(g(i, \text{nest})$ with nest being the number of levels counted from root) of the stage corresponding to the node is stored.

For example, $g(i, 2)$ for the templates abcd and abpq is stored in node N2 and is common to the templates having the common subsequence from a leading part to the node in question). Such a tree-structure and the buffers are employed, together with the foregoing characteristic of the recurrence formula, so that the stage calculation in every node can be carried out from the values in the buffer corresponding to its parent node and from the label described in the node.

Further, a locally best next branch, that is, template group is selected using the values in the buffer associated with a node. Various definitions of the locally best branch are of course conceivable. For instance, assuming that $g(i, \text{nest})$, a function of i, has a minimum value when $i=i_o$, the branch having the minimum distance from $a_{io+1}$ can be regarded as the locally best one.

Since the distance from the template group corresponding to the access path in question must be greater than $$\frac{g(i_o, \text{nest})}{(n + \text{the maximum length of the access path following the current node})},$$

the access path following the current node cannot have the minimum distance if another access path having a smaller distance than the value of the distance mentioned above has been already detected. The stage calculation for the following branch may be, therefore aborted.

The main point of the invention is that while constantly selecting the locally best branch, a tree is searched in a depth first manner. The access path corresponding to the template having the minimum distance is reached as early as possible, and the minimum distance at respective points of time and the access path thereof are stored in global variables min_dist and opt_path (shown in FIG. 2) so as to abort the stage calculation of the path following the node in question when the intermediate result of the recurrence formula exceeds the value of min_dist.

In this embodiment, a method for forming a tree-structured dictionary will be explained first, and a method for calculating the DP matching using the dictionary will be described thereafter.

(a) Formation of Tree-Structured Dictionary from Multiple Label Sequences

Figure 6:
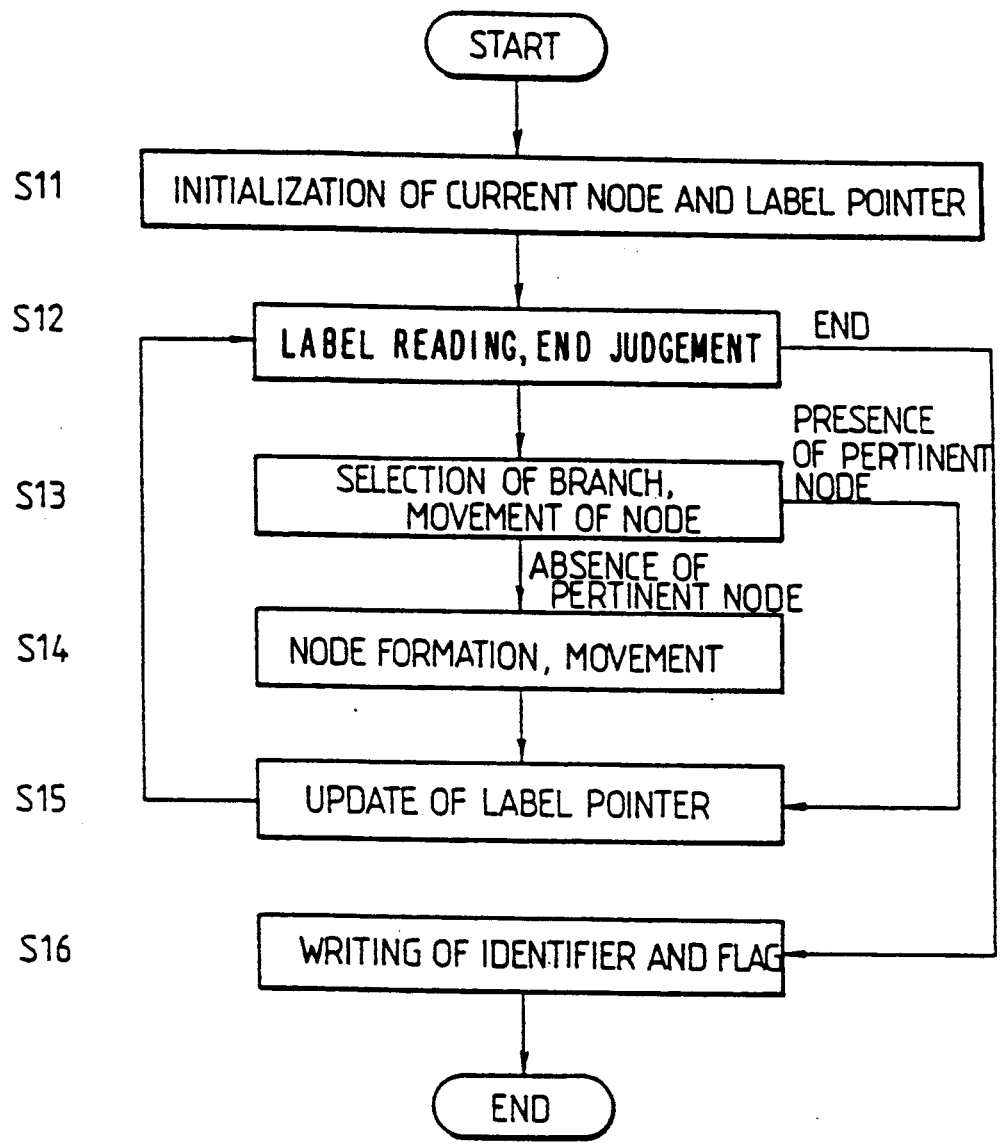
FIG. 6 is a flow chart of forming a tree-structured dictionary.

The formation of the above-mentioned dictionary is shown in FIG. 6, and is performed by sequentially adding branches corresponding to the respective label sequences to a dictionary having no branch but a root. Accordingly, the steps required for adding branches will be described first, and the formation of the dictionary and the deletion of the label sequences will be referred to later.

STEP S11

Place the label pointer (i) at the head of a sequence to be added (i←1).

Place the current node at the root node.

STEP S12

Read a label ($b_i$) indicated by the label pointer. If the label sequence ended and there is no label to be read, go to STEP S16 (end condition).

STEP S13

If a branch corresponding to the label $b_i$ from the current node already exists, move the current node to the descendant node following the branch and then go to STEP S15. If a pertinent branch is not present, go to STEP S14.

STEP S14

Extend the branch corresponding to the label $b_i$ from the current node and create a new node following it. Move the current node to the new node and then go to STEP S15.

STEP S15

Advance the label pointer by one ($i \leftarrow i+1$). Go to STEP S12.

A buffer is provided as the node is formed. The buffer may be situated outside the node and connected to the node by the pointer, or included in the node.

STEP S16

Write a flag indicating that the current node is the end of the added label sequence and the identifier of the corresponding sequence in the current node in question (processing ends).

As set forth above, a dictionary is formed by examining label sequences one by one from a sequence set which includes multiple label sequences. The order of examining the label sequences may be arbitrary. Each label sequence is examined by repeating steps S11 to S16. In the case of deleting a sequence, the process of tracing the corresponding branch while reading the labels sequentially from the label sequence in question is the same as that for adding a reference. However, instead of testing for the existence of the node, one tests for the number of label sequences which correspond to the descendant of the current node. If the number of label sequences is only one, the branch in question (the part succeeding the current node) is deleted.

(b) DP Matching Calculation

Figure 7:
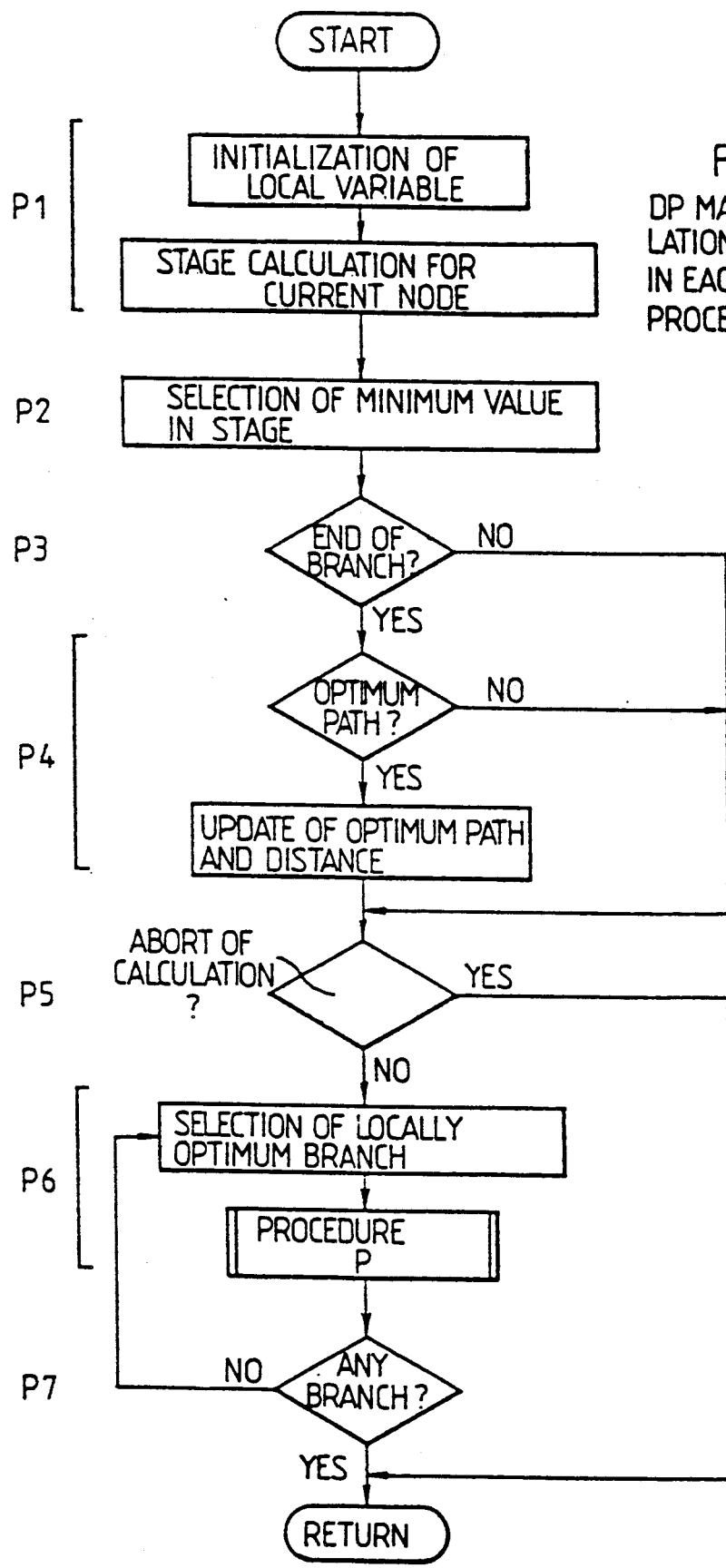
FIG. 7 is a flow chart of a DP calculation performed in each node.
Figure 8:
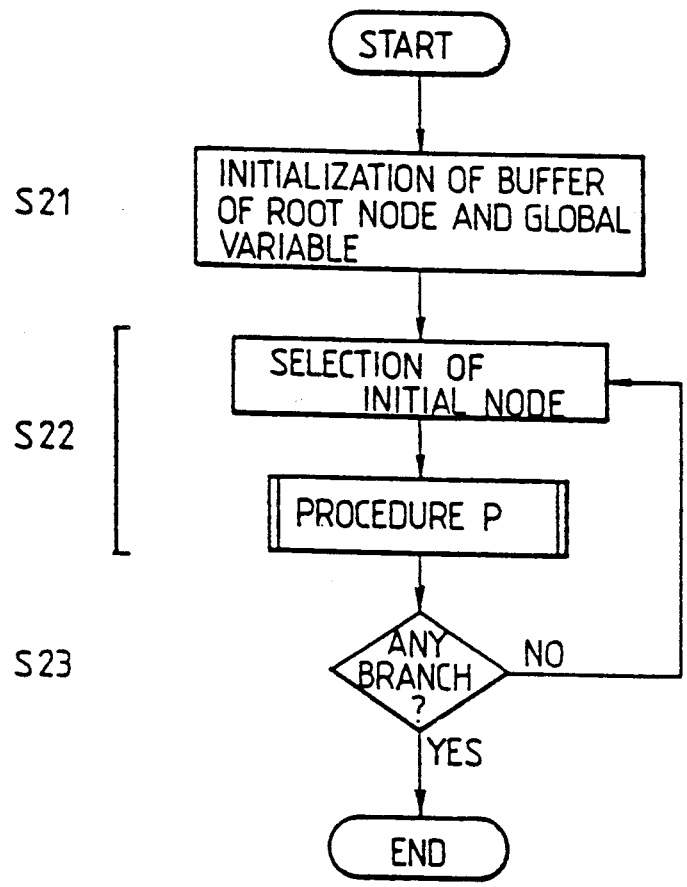
FIG. 8 is a flow chart showing the entire DP calculation.

The DP matching calculation which is the main part of the present invention will be described with reference to FIG. 7 and FIG. 8. A procedure P performed for one node will be first explained and a process that the procedure P is called and the DP calculation is executed will be described thereafter.

Procedure P

This procedure is recursively called together with three arguments, namely, a pointer (arg1) to a parent node, a pointer (arg2) to a current node performing the stage calculation, and the number (arg3) of levels counted from the root of a tree. FIG. 7 shows the sequence of processing the present Procedure P performed for each node.

STEP P1

The value of a variable nest is arg3.

The value of a variable max_nest is the maximum length of access path(s) following the current node.

Calculate $g(i, \text{nest})$ of the current node for each $i$ ($i = 1, \ldots, n$) from the stage calculation result $g(i, \text{nest}-1)$ stored in the buffer of the parent node based on the recurrence formula (2). Store the results in the buffer corresponding to the current node.

STEP P2

Figure 3:
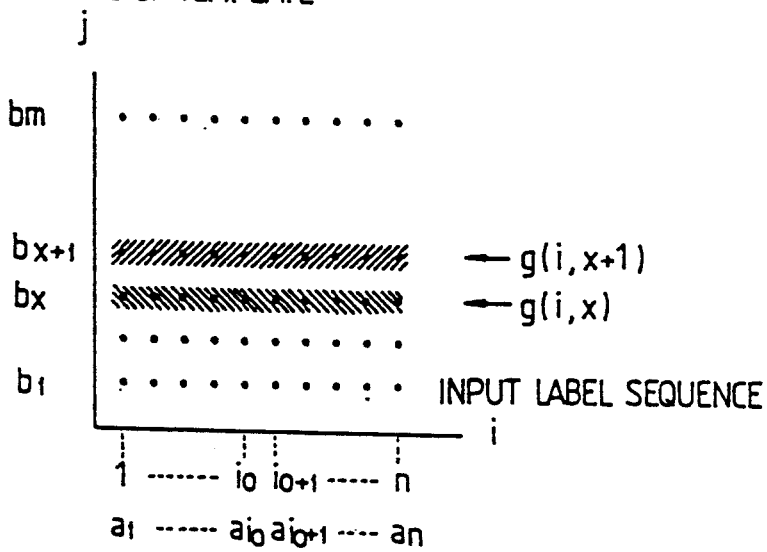
FIG. 3 explains the calculation for a recurrence formula.

Obtain the value $i_o$ having the minimum value among the components of the vector $g(i, \text{nest})$ obtained in STEP P1 (refer to FIG. 3).

STEP P3

If the current node is the end of a branch of the tree, go to STEP P4.

If it is not the end, go to P5.

In this connection, the "end" referred to herein means a node where one template is ended, but which is not necessarily an end in the tree structure. For instance, when there are templates pqr and pqrs, r is a node where one template is ended but it is not an end of the tree structure. Whether a node is an end or not is judged from the flag information provided in STEP S16.

STEP P4

If $g(n, \text{nest})/(n+\text{nest})$ of the current node is smaller than min_dist, update min_dist with $g(n, \text{nest})/(n+\text{nest})$ and opt_path with the template corresponding to the path from the root of the tree to the current node.

STEP P5

If $$\frac{g(i_o, \text{nest})}{(n + \text{max\_nest})}$$

is larger than min_dist, abort the following calculation and return. "Return" means to back track and indicates a return to an immediate ancestor node in this embodiment.

STEP P6

Select the branch having the minimum distance from $a_{i_o+1}$, replace arg1, arg2, arg3, respectively, by the current node, by the pointer to the next node, and by nest+1. Call the procedure P.

STEP P7

If the procedure P is called for every branch, return to a caller. Otherwise, go to P6.

According to this procedure, while the nodes are selected successively, the same operation is performed for each node, resulting in searching the whole tree.

A sequence for processing the entire method of the present invention using the procedure P can be described as follows (refer to FIG. 8).

Calculation Process

STEP S21

Store an initial value $g(i, 0)$ for each $i$ in the buffer corresponding to a root node (Root in FIG. 2).

Input a sufficiently large initial value to min_dist.

STEP S22

Select a branch in the ascending order of distance from a1 and regard it as an initial node. Initialize arg1, arg2, arg3, respectively, to the pointer to the root node, the pointer to the initial node, and 1. Call the procedure P.

STEP S23

If the calculation has been completed for every branch, the minimum distance has been obtained in min_dist and the identifier of the label sequence (access path) providing the minimum distance has been obtained in opt_path, therefore these values are stored. If there is a branch remaining, go to STEP S22.

A back track and the processing required for it will be explained by referring to FIG. 2. Assume that the end of the tree structure reached in the first iteration is k. The distance value D for the label sequence afhik is stored in min_dist at this time and the identifier P1 is stored in opt_path.

When the method back tracks from k to i, it is found that there are no branches from i. Therefore, the method back tracks further from i to h. Such an operation is repeated to reach a. Upon back tracking to node a, the fact that B1, one of the branches branching from a, has been selected is recorded. Since $a_{io}$ providing the minimum stage calculation value for a is stored in the buffer of a, one can calculate which of b or m is closer to $a_{io+1}$.

If b is selected, the procedure P is called for b. If the predicted value D' obtained according to STEP P5 based on the minimum value of the stage calculation result for b is larger than D, all further processing for the branch B2 is aborted. In this way, D is used as a threshold to eliminate the stage calculation for many nodes. This is the main feature of the present invention.

If D' is smaller than D, either c or p is selected and the procedure P is recursively called. If d is reached, it is determined whether the optimum solution information should be updated or not. If the distance D" for the template P2 is larger than D, the optimum solution information is not updated. If D" is smaller than D, D" is stored in min dist, and P2 is stored in opt_path.

Although the present invention has been explained above for a specific embodiment, the invention is not limited to that embodiment. A necessary condition for the application of the present invention is that DP is applicable to determine the distance between the label sequences to be compared, and the calculation using a recurrence formula can consequently be performed. Accordingly, any change or modification may be applied without deviation from the aim of the present invention. Additional modifications will now be described.

Equation (1) is a distance measure dependent on the path length for each pair of mapped labels. However a distance measure which does not depend on the path length may be used. In this case, g(n, m) is equal to the distance value alone, so that it is not necessary to describe the maximum length of following access path(s) for every node of the tree. In STEPs P4 and P5, g(n, nest) and $g(i_o,$ nest) may be directly compared with min_dist, respectively.

In the example mentioned above, the selected recurrence formula is between two adjacent terms. However, a recurrence formula between arbitrary terms can be used by passing not only a pointer to a parent node but also a pointer to a further ancestor node. It is understood that the scope to which the present invention is applicable does not depend on the coefficients of respective terms.

Figures 9A, 9B:
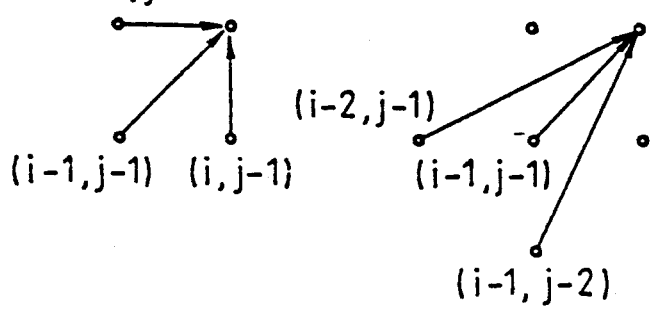
FIGS. 9a, 9b and 9c show examples of mappings permitted in the calculation of the recurrence formula.

Actually, the recurrence formula varies according to the definition of the distance or the allowable type of mapping. As shown in FIG. 9a, the recurrence formula of equation (2) has three points (i−1, j), (i, j−1), (i−1, j−1) as the immediately preceding points to a point (i, j). But it may be undesirable to join multiple labels to one label or constantly join one to any other in some applications. This is the case, for example, where a label which coincides with an arbitrary label is added to both ends of two label sequences to be compared, and the relation of d(a1, b1)=d(an, bm)=0 is provided, and then the recurrence formula as described below is used (see FIGS. 9b and 9c).

$$g(i,j) = \min \begin{bmatrix} g(i-2, j-1) + d(a_i, b_j) + \alpha \\ g(i-1, j-1) + d(a_i, b_j) \\ g(i-1, j-2) + d(a_i, b_j) + \alpha \end{bmatrix} \quad (3)$$

In equation (3), $\alpha$ is a selected penalty for a skip.

The present method is also applicable to this case.

Figure 9C:
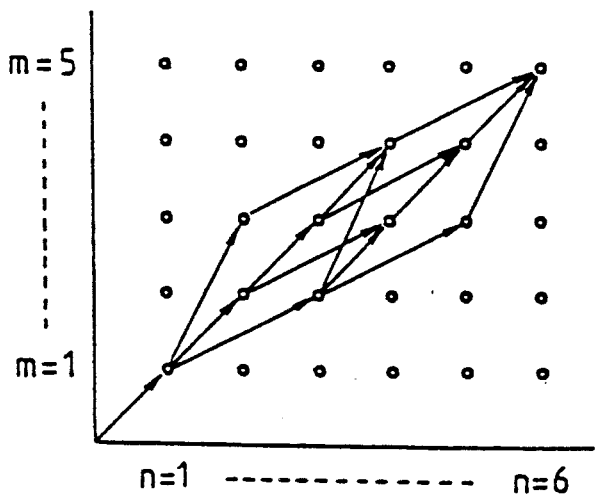
Figure 10:
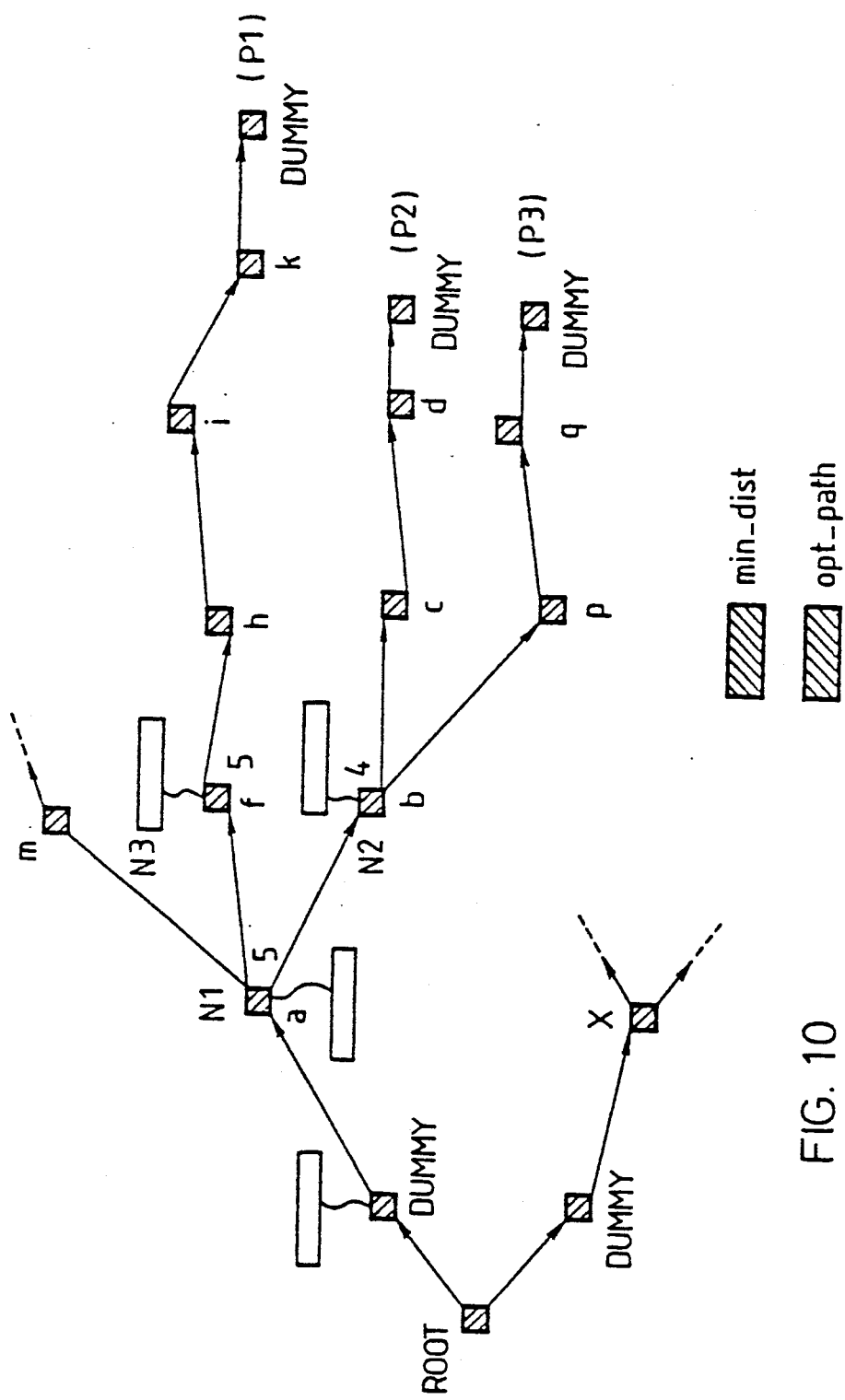
FIG. 10 explains an example of another tree-structured dictionary.

In FIG. 9c, the lattice points with m=1, n=1, m=5, n=6 are derived from newly added dummies. One example of the tree structured dictionary modified in response to the addition of the dummies is shown in FIG. 10. In this example, the nodes of the dummies are added to the root side and the end side. It should be noted that, as a result of the use of the recurrence formula of equation (3), i may be selected as a label next to f, for instance, in the template P1. In this case, however, the stage calculation for a label h has to be performed, because the result of the stage calculation for the label h is required in order to judge whether the label h should be skipped or not. The arrival at the dummy label at the end is judged to be the arrival at the end of one template and, whether optimum solution information should be updated or not is investigated at this time.

With reference to FIG. 11, a method for advancing the stage calculation in a case allowing a skip will be explained.

(i) Assuming that the present position is the node of the label a, it is necessary to consider both the minimum value $g(i_o, 2)$ in the stage (a) and the minimum value $g(k_o, 1)$ in the stage (dummy)+$\alpha$ (the penalty for a skip=$\alpha$) when judging which of m or f should be selected as the label for the next stage calculation. Assume that $i_o=2$. A label t is selected from m or f based on which of m or f has the smaller distance from $l_2$, in the input label sequence, corresponding to the case when a is initially skipped (FIG. 12a). A label t' is selected from m or f based on which of m or f has the smaller distance from $l_3$ corresponding to the case when a is not skipped (FIG. 12b). Then, $g(k_o, 1)+\alpha+d(l_2, t)$ is compared with $g(i_o, 2)+d(l_3, t)$. When the former is larger than the latter, a is not skipped. When the former is smaller than the latter, a is skipped.

(ii) When f is selected as a result of the preceding test, the stage calculation (shown with slanting lines in the drawing) is performed for the node of f based on the formula of equation (3) by referring to the stage calculation results performed for the parent node (a) and the grandparent node (dummy).

(iii) Since h is the only one label following f, the stage calculation is performed based on the stage calculation results of the grandparent node (a) and the parent node (f).

(iv) The processing is repeated.

The important points of the foregoing are as follows. In case a skip is permitted, it is necessary to judge whether the skip is advantageous or not when a node for the next stage calculation is selected from some candidates. For this decision, the stage calculation for the label to be skipped must be completed, so that the stage calculation is advanced stage by stage.

In this connection, $l_1$ in FIGS. 12a and 12b is a dummy.

In the above-described embodiment of the invention, a locally best next node is selected based on the mapping which makes g(i, j) minimum in the stage in question. Alternatively, the selection criteria may be replaced or modified.

For instance, generally in the DP calculation a calculation range (range of i) is often limited for each stage in order to avoid an extremely distorted mapping. According to similar reasoning, the extent of distortion of mapping should be considered for selecting a locally best branch, too.

A recursive product is convenient since the representation is simplified. But this is not an essential point of the present invention. Since a non-recursive description of the procedure of the same type is within the ability of those skilled in the art, the detailed explanation thereof will be omitted.

According to the method of the present invention, when the processing of the node in question is completed, it is necessary back track. Although the back track is simply executed to a parent node in the above-described embodiment, a shift to a further ancestor node may be carried out based on the consideration of the difference between g(i, j) and min_dist, and the number of the levels counted from the root.

When the present invention was applied to pattern matching in handwritten numeral recognition (the number of templates was approximately 1000), recognition proceeded about ten times as fast as recognition by calculating DP matching for all templates.

I claim:

1. A method for DP matching multiple label-sequences which form templates comprising the steps of:
   (a) generating from said multiple label-sequences a tree-structured dictionary having a root node, a plurality of intermediate nodes, a plurality of end nodes, and a plurality of paths from the root node through intermediate nodes to end nodes, each intermediate and each end node having only one incoming path segment from the root node to the intermediate node, each intermediate node having one ancestor node adjacent to the intermediate node along the incoming path segment into the intermediate node, each intermediate node having at least one outgoing path segment from the intermediate node to an end node, each intermediate node having one or more descendent nodes adjacent to the intermediate node along the outgoing path segments from the intermediate node, where each node corresponds to one label, and storing it in a storage device,
   (b) providing such label node in said tree-structured dictionary with a buffer area in said storage device,
   (b1) selecting an ancestor node in said tree-structured dictionary, said selected ancestor node having at least two descendent nodes,
   (c) selecting one descendent node of the two or more descendent nodes of the selected ancestor node, performing a stage calculation between the label corresponding to the selected descendent node and an input label sequence and storing the result in the buffer provided for the selected descendent node, the step (c) comprising the sub-steps of:
   (c1) referring to the stage calculation result stored in the buffer for the selected ancestor node,
   (c2) determining a label in the input label sequence providing the minimum value of the stage calculation result obtained in said sub-step (c1) and
   (c3) selecting a descendent node of the selected ancestor node, which descendent node corresponds to a label having the minimum distance from a label immediately after the label determined in the sub-step (c2) in the input label sequence, and
   (d1) if the selected descendent node is not an end node, then replacing the selected ancestor node with the selected descendent node, and repeating step (c), and
   (d2) after performing the stage calculation for the node which corresponds to the end of one template, storing the stage calculation result obtained for the end node with the identification data of the template as solution candidate information into said storage device.

2. A method according to claim 1 wherein the step (c) further comprises the steps of predicting the minimum value obtainable as a distance between a template which includes the label corresponding to the selected node and the input label sequence based on the minimum value of the calculation result obtained by performing the sub-step (c1),
   comparing the predicted value with the distance stored as solution candidate information and judging whether the sub-steps (c2) and (c3) should be performed or not from the comparison result.

3. A method according to claim 2 wherein the step (d) further comprises the steps of comparing a distance D' obtained for the template including the end node with a distance D stored as the solution candidate information each time the stage calculation is performed for the node which corresponds to the end of one template and judging whether the solution candidate information should be updated or not from the comparison result.

4. A method for DP matching for using multiple label-sequences which form templates comprising the steps of:
   (a) generating from said multiple label-sequences a tree-structured dictionary having a root node, a plurality of intermediate nodes, a plurality of end nodes, and a plurality of paths from the root node through intermediate nodes to end nodes, each intermediate and each end node having only one incoming path segment from the root node to the intermediate node, each intermediate node having one ancestor node adjacent to the intermediate node along the incoming path segment into the intermediate node, each intermediate node having at least one outgoing path segment from the intermediate node to an end node, each intermediate node having one or more descendent nodes adjacent to the intermediate node along the outgoing path segments from the intermediate node, where each node corresponds to one label and storing it in a storage device,
   (b) providing each label node in said tree-structured dictionary with a buffer area in said storage device,
   (b1) selecting an ancestor node in said tree-structured dictionary, said selected ancestor node having at least two descendent nodes,
   (c) selecting one descendent node of the two or more descendent nodes of the selected ancestor node, performing a stage calculation between the label corresponding to the selected descendent node and an input label sequence and storing the result in the buffer provided for the selected descendent node, the step (c) comprising the sub-steps of:
   (c1) referring to the stage calculation result stored in the buffer for the selected ancestor node, (c2) determining an optimum node to be selected for the next stage calculation from a predetermined range of descendent nodes of the selected ancestor node by referring to the stage calculation result stored in the buffer of a predetermined range of nodes which include said selected node at least and selecting the determined node as a node for the next stage calculation and (d1) if the selected descendent node is not an end node, then replacing the selected ancestor node with the selected descendent node, and repeating step (c), and (d2) after performing the stage calculation for the node which corresponds to the end of one template, storing the stage calculation result obtained for the end node with the identification data of the template as solution candidate information into said storage device.

5. A method according to claim 4 wherein the step (c) further comprises the steps of predicting the minimum value obtainable as a distance between a template which includes the label corresponding to the selected node and the input label sequence based on the minimum value of the calculation result obtained by performing the sub-step (c1), comparing the predicted value with the distance stored as the solution candidate information, and judging whether the sub-step (c2) should be performed or not from the comparison result.

6. A method according to claim 5 wherein the step (d) further comprises the steps of comparing a distance D' obtained for the template including the end node with a distance D stored as the solution candidate information each time the stage calculation is performed for the node which corresponds to the end of one template and judging whether the solution candidate information should be updated or not from the comparison result.

7. An apparatus for DP matching between an input label sequence and multiple label-sequences which form templates comprising:

(a) a storage device, (b) means for receiving the multiple label-sequences, forming a tree-structured dictionary having a root node, a plurality of intermediate nodes, a plurality of end nodes, and a plurality of paths from the root node through intermediate nodes to end nodes, each intermediate and each end node having only one incoming path segment from the root node to the intermediate node, each intermediate node having one ancestor node adjacent to the intermediate node along the incoming path segment into the intermediate node, each intermediate node having at least one outgoing path segment from the intermediate node to an end node, each intermediate node having one or more descendent nodes adjacent to the intermediate node along the outgoing path segments from the intermediate node, where each node corresponds to one label, storing it in said storage device and providing each label node in the tree-structure dictionary with a buffer area in said storage device, (b1) means for selecting an ancestor node in said tree-structured dictionary, said selected ancestor node having at least two descendent nodes, (c) means for selecting one descendent node of the two or more descendent nodes of the selected ancestor node, performing a stage calculation between the label corresponding to the selected descendent node and an input label sequence and storing the result in the buffer provided for the selected descendent node, said operations including:

(c1) referring to the stage calculation result stored in the buffer for the selected ancestor node, (c2) determination of a label in the input label sequence providing the minimum value of the stage calculation result obtained by said operation (c1), and (c3) selection of a descendent node of the selected ancestor node, which descendent node corresponds to a label having the minimum distance from the label immediately after the label determined in the step (c2) in the input label sequence, and (d1) means for replacing, if the selected descendent node is not an end node, the selected ancestor node with the selected descendent node, and repeating step (c), and (d2) means for storing, after the performance of the stage calculation for the node which corresponds to the end of one template, the stage calculation result obtained for the end node with the identification data of the template as solution candidate information into said storage device.

8. An apparatus according to claim 7 wherein said means (c) predicts a minimum value obtainable as a distance between a template which includes the label corresponding to the selected node and the input label sequence based on the minimum value of the calculation result obtained by performing the operation (c1), compares said predicted value with the distance stored as the solution candidate information and judges whether the operations (c2) and (c3) should be performed or not from the comparison result.

9. An apparatus according to claim 8 wherein said means (d) compares a distance D' obtained for the template including the end node with a distance D stored as solution candidate information each time the stage calculation is performed for the node which corresponds to the end of one template and judges whether the solution candidate information should be updated or not from the comparison result.

10. An apparatus for DP matching between an input label sequence and multiple label-sequences which form templates comprising:

(a) a storage device, (b) means for receiving the multiple label-sequences, forming a tree-structured dictionary having a root node, a plurality of intermediate nodes, a plurality of end nodes, and a plurality of paths from the root node through intermediate nodes to end nodes, each intermediate and each end node having only one incoming path segment from the root node to the intermediate node, each intermediate node having one ancestor node adjacent to the intermediate node along the incoming path segment into the intermediate node, each intermediate node having at least one outgoing path segment from the intermediate node to an end node, each intermediate node having one or more descendent nodes adjacent to the intermediate node along the outgoing path segments from the intermediate node, where each node corresponds to one label, storing it in said storage device and providing each label node in the tree-structured dictionary with a buffer area in said storage device, (b1) means for selecting an ancestor node in said tree-structured dictionary, said selected ancestor node having at least two descendent nodes, (c) means for selecting one descendent node of the two or more descendent nodes of the selected ancestor node, performing a stage calculation between the label corresponding to the selected descendent node and an input label sequence, storing the result in a buffer provided for the selected descendent node, said operations including:

(c1) referring to the stage calculation result stored in the buffer for the selected ancestor node, (c2) determination of an optimum node to be selected for a next stage calculation from labels of a predetermined range of descendant nodes of the selected ancestor node by referring to the stage calculation result stored in the buffer of a predetermined range of nodes which include the selected node at least and selection of the determined node as a node for the next stage calculation and (d1) means for replacing, if the selected descendent node is not an end node, the selected ancestor node with the selected descendent node, and repeating step (c), and (d2) means for storing, after the performance of the stage calculation for the node which corresponds to the end of one template, the stage calculation result obtained for the end node with the identification data of the template as solution candidate information into said storage device.

11. An apparatus according to claim 10 wherein said means (c) predicts a minimum value obtainable as a distance between a template which includes the label corresponding to the selected node and the input label sequence based on the minimum value of the calculation result obtained by the operation (c1), compares the predicted value with the distance stored as the solution candidate information and judges whether the operation (c2) should be performed or not from the comparison result.

12. An apparatus according to claim 11 wherein said means (d) compares a distance D' obtained for the template including the end node with a distance D stored as the solution candidate information each time the stage calculation is performed for the node which corresponds to the end of one template and judges whether the solution candidate information should be updated or not from the comparison result.

13. A pattern recognition method comprising the steps of:

generating a sequence of feature label signals, each feature label signal having a value representing the value of at least one feature of an observed information signal;

storing a candidate set of template signals, each template signal having a value representing a template sequence of reference labels, each reference label having a value;

partitioning the candidate set of template signals into at least first and second subsets of one or more template signals, each template signal in the first subset having a value representing a sequence of reference labels beginning with a first subsequence of one or more reference labels, each template signal in the second subset having a value representing a sequence of reference labels beginning with a second subsequence of one or more reference labels different from the first subsequence of reference labels;

matching the values of the sequence of feature labels against the values of the reference labels in the first subsequence to produce a first match score signal having a match score value representing the similarity of the sequence of feature labels to the reference labels in the first subsequence;

matching the values of the sequence of feature labels against the values of the reference labels in the second subsequence to produce a second match score signal having a match score value representing the similarity of the sequence of feature labels to the reference labels in the second subsequence;

selecting as a local optimum subset of template signals the first subset of template signals if the first match score is better than the second match score, or the second subset of template signals if the second match score is better than the first match score;

finding, from the template signals in the local optimum subset, the local optimum template signal whose value is best matched to the values of the sequence of feature labels to produce a local optimum match score signal having a local optimum match score value representing the similarity of the sequence of feature labels to reference labels represented by the local optimum template;

defining a remainder set of template signals containing template signals which are not in the local optimum subset of templates;

partitioning the remainder set of template signals into at least first and second remainder subsets of one or more template signals, each template signal in the first remainder subset having a value representing a sequence of reference labels beginning with a first remainder subsequence of one or more reference labels, each template signal in the second remainder subset having a value representing a sequence of reference labels beginning with a second remainder subsequence of one or more reference labels different from the first remainder subsequence of reference labels;

matching the values of the sequence of feature labels against the values of the reference labels in the first remainder subsequence to produce a first remainder match score signal having a remainder match score value representing the similarity of the sequence of feature labels to the reference labels in the first remainder subsequence; and removing the first remainder subset of template signals from the candidate set of template signals if the local optimum match score value is better than the remainder match score value.

14. A pattern recognition apparatus comprising:

means for generating a sequence of feature label signals, each feature label signal having a value representing the value of at least one feature of an observed information signal;

means for storing a candidate set of template signals, each template signal having a value representing a template sequence of reference labels, each reference label having a value;

means for partitioning the candidate set of template signals into at least first and second subsets of one or more template signals, each template signal in the first subset having a value representing a sequence of reference labels beginning with a first subsequence of one or more reference labels, each template signal in the second subset having a value representing a sequence of reference labels beginning with a second subsequence of one or more reference labels different from the first subsequence of reference labels;

means for matching the values of the sequence of feature labels against the values of the reference labels in the first subsequence to produce a first match score signal having a match score value representing the similarity of the sequence of feature labels to the reference labels in the first subsequence;

means for matching the values of the sequence of feature labels against the values of the reference labels in the second subsequence to produce a second match score signal having a match score value representing the similarity of the sequence of feature labels to the reference labels in the second subsequence;

means for selecting as a local optimum subset of template signals the first subset of template signals if the first match score is better than the second match score, or the second subset of template signals if the second match score is better than the first match score;

means for finding, from the template signals in the local optimum subset, the local optimum template signal whose value is best matched to the values of the sequence of feature labels to produce a local optimum match score signal having a local optimum match score value representing the similarity of the sequence of feature labels to reference labels represented by the local optimum template;

means for defining a remainder set of template signals containing template signals which are not in the local optimum subset of templates;

means for partitioning the remainder set of template signals into at least first and second remainder subsets of one or more template signals, each template signal in the first remainder subset having a value representing a sequence of reference labels beginning with a first remainder subsequence of one or more reference labels, each template signal in the second remainder subset having a value representing a sequence of reference labels beginning with a second remainder subsequence of one or more reference labels different from the first remainder subsequence of reference labels;

means for matching the values of the sequence of feature labels against the values of the reference labels in the first remainder subsequence to produce a first remainder match score signal having a remainder match score value representing the similarity of the sequence of feature labels to the reference labels in the first remainder subsequence; and means for removing the first remainder subset of template signals from the candidate set of template signals if the local optimum match score value is better than the remainder match score value.

* * * * *